(12) United States Patent
Mier et al.

(10) Patent No.: US 8,106,123 B2
(45) Date of Patent: Jan. 31, 2012

(54) MODIFIED RESINS FOR BLOWN FILM

(75) Inventors: Rodolfo Mier, Pasadena, TX (US);
Mark Miller, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 685 days.

(21) Appl. No.: 12/002,560

(22) Filed: Dec. 17, 2007

(65) Prior Publication Data
US 2009/0156773 A1 Jun. 18, 2009

(51) Int. Cl.
*C08L 53/00* (2006.01)
*C08K 5/00* (2006.01)

(52) U.S. Cl. .......................... 525/89; 524/515

(58) Field of Classification Search .............. 524/515; 525/89, 191
See application file for complete search history.

(56) References Cited

U.S. PATENT DOCUMENTS

| 5,258,464 | A | 11/1993 | McCullough, Jr. et al. | |
|---|---|---|---|---|
| 6,939,919 | B2 * | 9/2005 | Tau et al. | 525/191 |
| 2002/0006482 | A1 * | 1/2002 | Falla et al. | 428/35.2 |
| 2002/0156193 | A1 | 10/2002 | Tau et al. | |
| 2003/0134981 | A1 | 7/2003 | Kim | |
| 2004/0067288 | A1 | 4/2004 | Wu et al. | |
| 2005/0154096 | A1 * | 7/2005 | Kelly et al. | 524/59 |
| 2006/0009586 | A1 * | 1/2006 | Aguirre et al. | 525/240 |
| 2007/0010622 | A1 * | 1/2007 | Naito et al. | 525/89 |
| 2007/0054997 | A1 * | 3/2007 | Pierini et al. | 524/109 |
| 2007/0059545 | A1 | 3/2007 | Emiliani et al. | |
| 2007/0167577 | A1 | 7/2007 | Aguirre et al. | |

OTHER PUBLICATIONS

Kerscher, Clarifiers for PP Film, Sep. 17-21, 2006, 2006 PLACE Comference.

* cited by examiner

*Primary Examiner* — Mark Eashoo
*Assistant Examiner* — Angela C Scott

(57) ABSTRACT

Processes for enhancing blown film processability and the blown films formed thereby are described herein. One embodiment of the processes generally includes providing a first propylene based heterophasic copolymer having a first melt flow rate, modifying the first propylene based heterophasic copolymer to form a second heterophasic polymer having a second melt flow rate, wherein the second melt flow rate is greater than the first melt flow rate, contacting the first heterophasic polymer, the second heterophasic copolymer or a combination thereof with a plurality of additives, wherein the plurality of additives include a nucleator, polyethylene and mineral oil to form a modified heterophasic copolymer and blowing the modified heterophasic polymer into a film.

9 Claims, 6 Drawing Sheets

FIG. 3

Complex Viscosity Curve of pellet samples prepared on the Leistritz

MODIFIED RESINS FOR BLOWN FILM

FIELD

Embodiments of the present invention generally relate to impact copolymers for use in blown film applications.

BACKGROUND

It has been observed that impact copolymers with a low melt flow rate (MFR) may have high melt strength and mechanical properties that enable blown extrusion in monolayer structures with bubble stability.

However, low MFR polymers are generally difficult to extrude as a result of the low melt flow rate.

Therefore, a need exists to develop a polymer experiencing the benefits of low MFR impact copolymers, while enabling greater processing efficiencies.

SUMMARY

Embodiments of the present invention include processes for enhancing blown film processability and the blown films formed thereby. One embodiment of the processes generally includes providing a first propylene based heterophasic copolymer having a first melt flow rate, modifying the first propylene based heterophasic copolymer to form a second heterophasic polymer having a second melt flow rate, wherein the second melt flow rate is greater than the first melt flow rate, contacting the first heterophasic polymer, the second heterophasic copolymer or a combination thereof with a plurality of additives, wherein the plurality of additives include a nucleator, polyethylene and mineral oil to form a modified heterophasic copolymer and blowing the modified heterophasic polymer into a film.

Another embodiment includes providing a first propylene based heterophasic copolymer having a first melt flow rate, modifying the first propylene based heterophasic copolymer to form a second heterophasic polymer having a second melt flow rate, wherein the second melt flow rate is greater than the first melt flow rate, contacting the first heterophasic polymer, the second heterophasic copolymer or a combination thereof with a plurality of additives, wherein the plurality of additives including a nucleator, polyethylene and mineral oil to form a modified heterophasic copolymer and blowing the second heterophasic polymer into a film.

Yet another embodiment includes providing a propylene based heterophasic copolymer, wherein the propylene based heterophasic copolymer has a melt flow rate of at least about 1.0, contacting the propylene based heterophasic polymer with a polyethylene and blowing the propylene based heterophasic polymer into a film.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Embodiments of the invention generally include heterophasic polymers and process of forming the same. As used herein, the term "heterophasic" generally refers to a polymer having two or more phases. For example, the first phase may include a homopolymer, such as polypropylene. Unless otherwise specified, the term propylene homopolymers include those polymers composed primarily of propylene and limited amounts of other comonomers, such as ethylene, wherein the comonomer make up less than about 2 wt. % (e.g., mini random copolymers), or less than about 0.5 wt. % or less than about 0.1 wt. % by weight of polymer.

The second phase generally includes a rubber phase, such as ethylene-propylene rubber. The incorporation of the rubber phase into the polymer matrix generally improves impact properties. As a result, the heterophasic polymers may also be referred to as impact copolymers.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. As is known in the art, the catalysts may be activated for subsequent polymerization and may or may not be associated with a support material. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through π bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example. Alternatively, other types of polymerization processes may be used, such as stirred reactors in series, parallel or combinations thereof, for example.

In one or more embodiments, the impact copolymers are formed by incorporating a rubber fraction into the polymer matrix by methods known to one skilled in the art, such as via mechanical blending or co-polymerization, for example. The co-polymerization process may include at least two stages, wherein the propylene homopolymer is produced in a first reaction zone, the product of which is transferred to a second reaction zone for contact with a comonomer and additional propylene monomer.

Embodiments of the invention generally include contacting the homopolymer with ethylene to form a polymer having greater than about 2 wt. %, or greater than about 4 wt. %, or greater than about 8 wt. % or greater than about 10 wt. % ethylene.

Polymer Product

Upon removal from the reactor, the polymer may be passed to a polymer recovery system for further processing, such as addition of additives and/or extrusion, for example. However, the polymers (the low MFR polymer) described herein are generally difficult to extrude as a result of the low melt flow rate (e.g., resulting in a significant reduction in output, such as 10%, or 20%, or 30%, for example). Therefore, embodiments of the invention provide for the modification of the low MFR polymers to form higher modified melt flow rate polymers.

In the embodiments described herein, the polymer, which may also be referred to herein as a heterophasic copolymer, is propylene based. As used herein, the term "propylene based" refers to a polymer having at least about 80 wt. %, or at least about 85 wt. % or at least about 90 wt. % polypropylene.

In a first embodiment, the polymer, which will be referred to hereafter as a low melt flow rate (MFR) polymer for the purposes of this embodiment, generally has a melt flow rate of less than about 1 dg/min., or less than about 0.9 dg/min. or less than about 0.8 dg/min.

One or more embodiments include increasing the melt flow rate of the low MFR polymer. The melt flow rate may be increased in a variety of ways, such as by blending with one or more additives, by blending with a higher melt flow rate polymer or by polymerization with a higher melt flow rate polymer. The higher melt flow rate polymer may include a propylene based polymer having a melt flow rate of at least about 5 or at least about 7, for example.

In one embodiment, the melt flow rate is increased by contacting the low MFR polymer with a polymer having a melt flow rate (second heterophasic copolymer) greater than the melt flow rate of the low MFR polymer to form a polymer having a melt flow rate that is higher than the melt flow rate of the low MFR polymer (e.g., a higher modified MFR polymer). In one embodiment, the melt flow rate of the higher modified MFR polymer is greater than about 1.0 or greater than about 1.5, for example.

As stated above, the second copolymer generally includes a heterophasic copolymer as described herein. The higher modified MFR may include the second copolymer in any amount necessary to increase the melt flow rate of the low MFR polymer. In one embodiment, the higher modified MFR polymer includes the second polymer in an amount of at least about 10 wt. % or at least about 15 wt. % or at least about 20 wt. %, for example. In one or more embodiments, the higher modified MFR polymer includes the second polymer in an amount of less than about 50 wt. %, for example However, it has been observed that lower melt flow rate polymers experience difficulties in blowing, such as increased extruder pressure, for example. Accordingly, embodiments of the invention may include blending the low MFR polymer, the higher MRF polymer or both of the polymers (referred to herein simply as "polymer") with a plurality of additives. The plurality of additives may include a processing aid, such as mineral oil. In an embodiment, the mineral oil is used in concentrations of from about 1 wt. % to about 8 wt. %, or from about 2 wt. % to about 7 wt. % or from about 4 wt. % to about 6 wt. % by weight of the polymer.

However, it has been discovered that the higher MRF polymer (either alone or in combination with the mineral oil) may experience bubble instability upon blowing. Bubble instability in blown-film extrusion creates problems that may vary from a fluctuating film gauge and width to scratches and tears, for example.

Therefore, the plurality of additives generally include at lease one additive selected from nucleators and clarifiers (which will be referred to herein as nucleators). The nucleators may include any nucleator known to one skilled in the art. For example, non-limiting examples of nucleators may include carboxylic acid salts, including sodium benzoate, talc, phosphates, metallic-silicate hydrates, organic derivatives of dibenzylidene sorbitol, sorbitol acetals, organophosphate salts and combinations thereof. In one embodiment, the nucleators are selected from Amfine Na-11 and Na-21, commercially available from Amfine Chemical, Milliken HPN-68, Hyprtgotm HPN-68 and Millad 3988, commercially available from Milliken Chemical.

In an embodiment, the nucleators may be used in concentrations of from about 0 to about 3000 ppm, or from about 5 ppm to about 1000 ppm or from about 10 ppm to about 500 ppm by weight of the polymer, for example.

The plurality of additives may further include metallocene based polyethylene. In an embodiment, the polyethylene is used in concentrations of from about 1 wt. % to about 8 wt. %, or from about 1.5 wt. % to about 5 wt. % or from about 2 wt. % to about 4 wt. % by weight of the polymer.

The plurality of additives may contact the polymer by any method known to one skilled in the art. For example, the additives may contact the polymer prior to extrusion (within the polymerization process) or within the extruder, for example. In one embodiment, the additives contact the polymer independently. In another embodiment, the additives are contacted with one another prior to contacting the polymer. In one embodiment, the contact includes blending, such as mechanical blending, for example.

In a second embodiment, the polymer, which will be referred to hereafter as a high melt flow rate (MFR) polymer for purposes of this embodiment, generally has a melt flow rate of at least about 1.0 dg/min., or at least about 5.0 dg/min. or at least about 10.0 dg/min. However, the high MFR polymers described herein generally result in low melt strength during processing. Further, as described above, high and/or higher MFR polymers may experience bubble instability.

Therefore, one or more embodiments include coextruding the high MFR polymer with a polyethylene polymer. In one embodiment, the polyethylene polymer includes a medium density polyethylene. As used herein, the term "medium density polyethylene" refers to a polyethylene polymer having a density of from about 0.8 g/cc to about 0.97 g/cc or from about 0.9 g/cc to about 0.97 g/cc, for example.

The high MFR polymer and the polyethylene polymer may be coextruded by any method known to one skilled in the art. While discussed herein in terms of coextrusion, it is contemplated that the high MFR polymer and the polyethylene polymer may be blended.

In one embodiment, the high MFR polymer is coextruded with two portions of polyethylene, so as to provide a layer of polyethylene on both surfaces of the high MFR polymer. For example, the coextruded polymer may include from about 20 wt. % to about 60 wt. %, or from about 25 wt. % to about 50 wt. % or from about 30 wt. % to about 45 wt. % high MFR polymer.

The second embodiment has resulted in improved melt stability, bubble stability and adhesion between layers in the absence of a tie layer over high MFR polymers absent embodiments of the invention.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

In particular, the polymers are useful for blown film applications. In one example of a blown film process, polymer pellets are fed into an extruder, where they are melted and homogenized before being pumped through a circular blown film die to form a continuous molten tube. The tube is drawn from the die, inflated with air and simultaneously cooled by rapidly moving air, so that the polymer quickly solidifies. The tube is then collapsed between rollers and wound onto a reel. The blown films may be multilayer or mono layer films.

It has been seen that impact copolymers (or heterophasic copolymers) with a low melt flow rate have high melt strength and mechanical properties that enable blown extrusion in monolayer structures with bubble stability. However, by slightly increasing the melt flow rate of the polymers via the embodiments described herein, the blown films experience improved processability (during plant extrusion and during blown film extrusion) and bubble stability (during blown film processing).

EXAMPLES

Materials: Polymer A is an impact copolymer with 0.75 MFR for blown film applications. Polymer B is an impact copolymer with 7.0 MFR for cast film applications. Both grades contain a total ethylene content of 11%. Polymer C is a 1.3 MFR impact copolymer with a total ethylene content of 11.5%.

The additives included an irradiated HM200F homopolymer from Samsumg, a silicone gum from Wacker, a polyethylene wax Polywax 500 mini-prills from Baker Petrolite, two fluoropolymers Z100 and SAR 7468 from Dupont, Total Petrochemicals M2710 EP metallocene medium density polyethylene, mineral oil Drakeol 34 from Penreco and Milliad 3988, commercially available from Milliken.

Example 1

Samples of Blown Film were Prepared According to the First Embodiment

Experimental. The first stage involved the use of Brabender twin and single screw extruders as small scale screening tools. The compounding on the Brabender twin screw was done at 100 rpm, using a temperature from 200° C. at the extruder to 215° C. at the die and 100% starve feed under nitrogen purge. Polymer A was run between the sample runs. The pellet samples prepared on the Brabender twin extruder were processed on the Brabender single screw for a pressure and throughput study and some of the alternatives were evaluated in film blowing on a David Standard mini coex line. The Brabender single screw runs were done at 100 rpm, with 160° C./170° C./215° C./200° C. as a temperature profile (with no screen pack) and running Polymer A as a control sample between the runs.

The blown film runs were done at 752 rpm using an extrusion temperature profile of 380° F./450° F./450° F., 390° F. at the adapter and 430° F. at the die zones. The films were produced at 2.5 BUR (9⅜" layflat) and 2 mils in thickness.

The second stage involved a larger scale compounding study to prepare impact copolymer samples based on A, B, and C for evaluation on a blown film line. Other samples prepared in this second stage involved the use of peroxide Lupersol 101 to achieve a 1.5 MFR, metallocene medium density polyethylene (Total Petrochemicals M2710 EP) at 2% and mineral oil (Panreco Drakeol 34) at 5%. The pellet samples prepared were processed on the blown film line at 75 rpm, 0.9 mm die gap and 440° F. to produce a 1 mils, 18.6" layflat (2.5 BUR).

Figure 1:
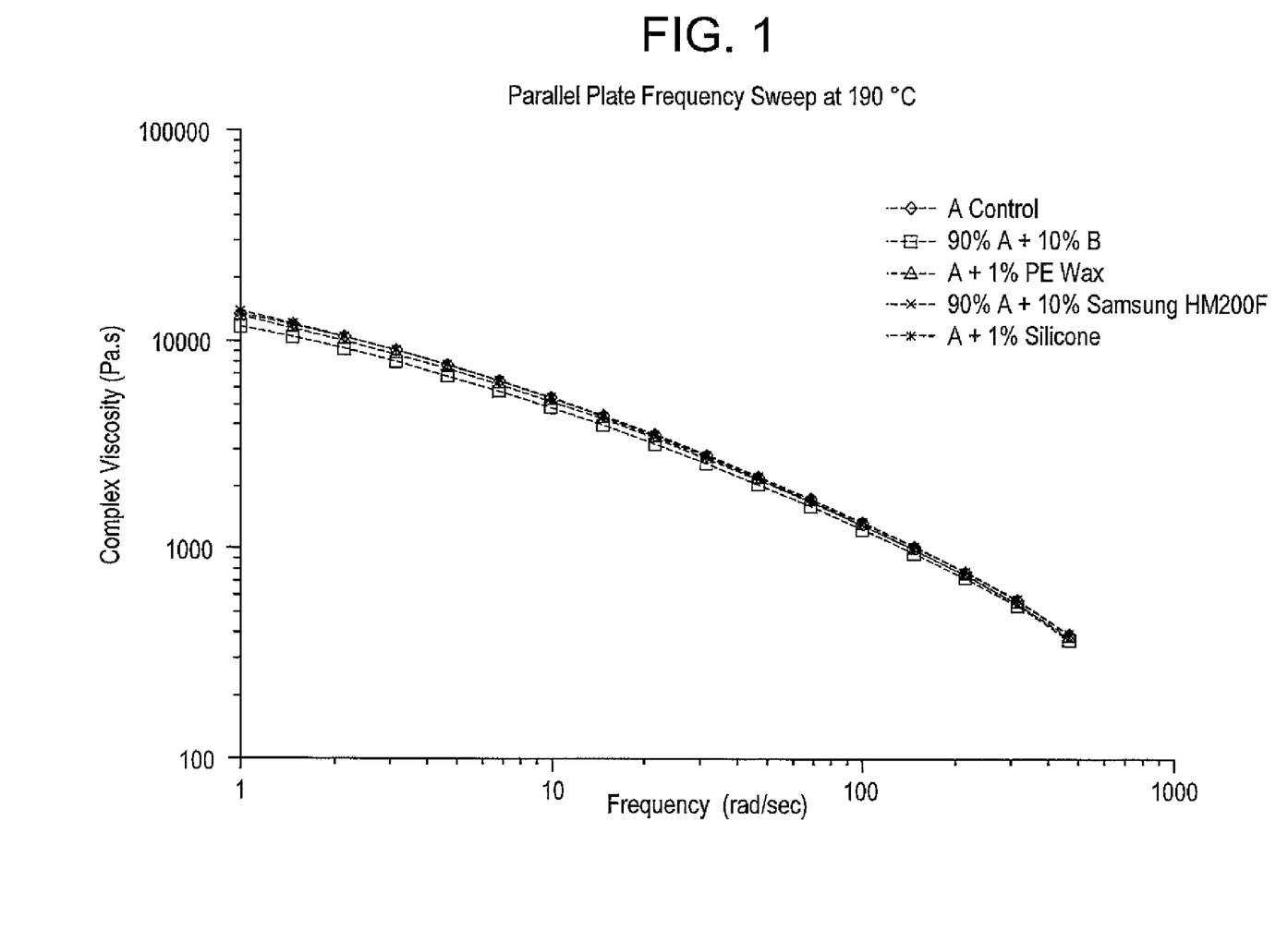
FIG. 1 presents the complex viscosity data of selected polymer samples.

Results: FIG. 1 presents the complex viscosity data of selected pellet samples compounded on the Brabender twin screw extruder. A negligible effect on the viscosity of A was obtained with 1% polyethylene wax, 1% silicone gum and 10% Samsumg HM200F irradiated homopolymer. Increasing the melt flow of A through B had the greatest effect in decreasing the viscosity.

Figure 2:
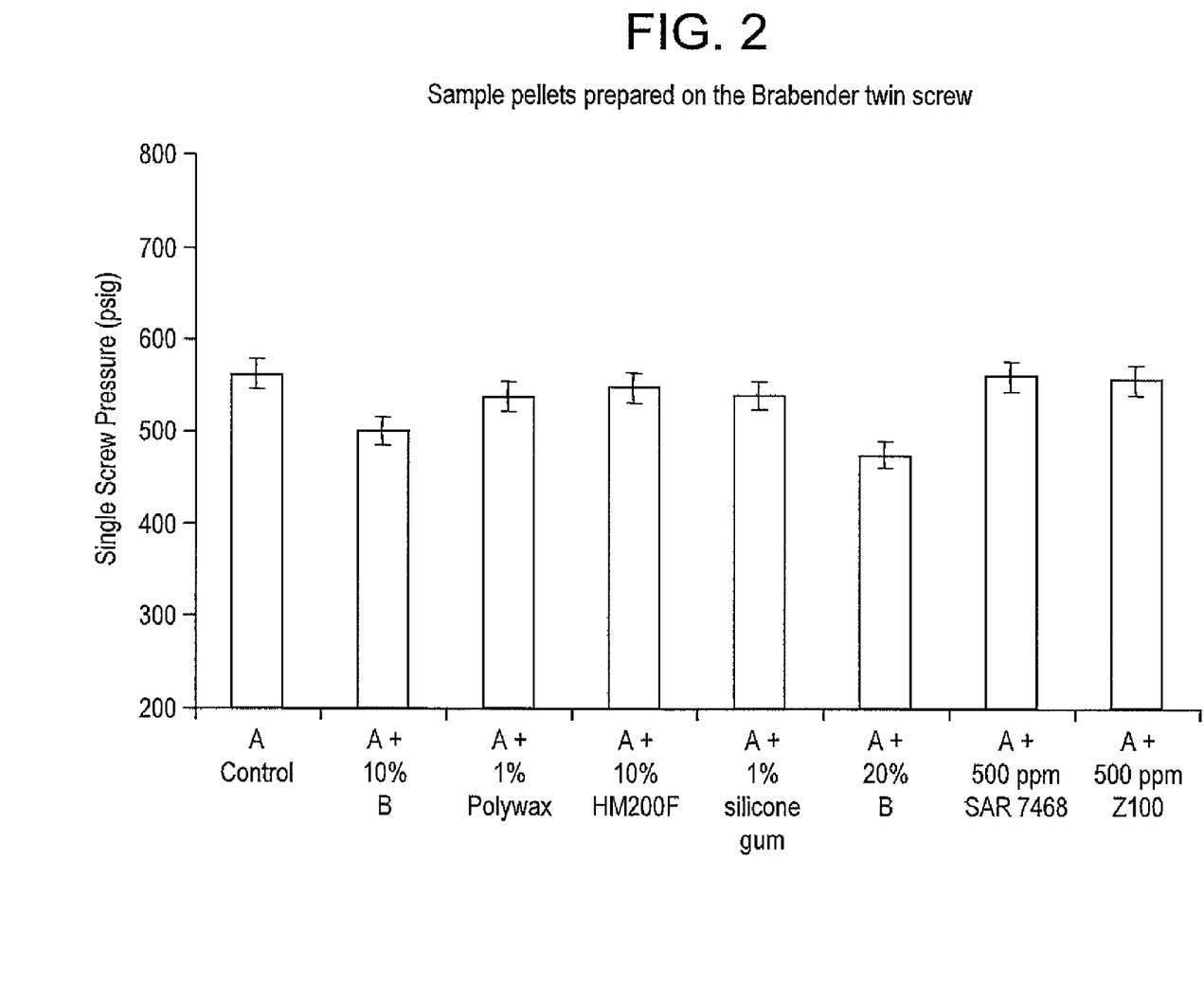
FIG. 2 presents the melt pressure for the polymer samples.

FIG. 2 presents the melt pressure measurements obtained on the Brabender single screw extruder for the pellet samples prepared on the Brabender twin screw extruder. With the exception of the higher modified MFR samples made with "A" blended at 10% and 20% B, no significant decrease in melt pressure was achieved with any of the other materials used as viscosity modifiers. An equivalent output (44 g/min) was obtained on the single screw extruder for all of the samples.

Table 1 presents the extrusion pressure, temperature and amperes observed for selected pellet samples during the runs on the laboratory blown film line. The extrusion data obtained for the blend containing 20% B are in agreement with the shear viscosity measurements from the strain rheometer and the melt pressure measurements from the Brabender single screw. The tensile strength, secant modulus, tear resistance, dart impact, and puncture strength of the 80% A+20% B film are within the standard deviation of the testing results obtained for the A control film.

TABLE 1

Extrusion measurements during runs

| Sample | Pressure (psig) | Temperature (F.) | Current (amps) |
|---|---|---|---|
| A | 3100 | 430 | 50 |
| A | 2900 | 430 | 45 |
| A + 20% B | 2500 | 428 | 43 |
| A + 500 ppm Z100 | 2800 | 428 | 43 |

Figure 3:
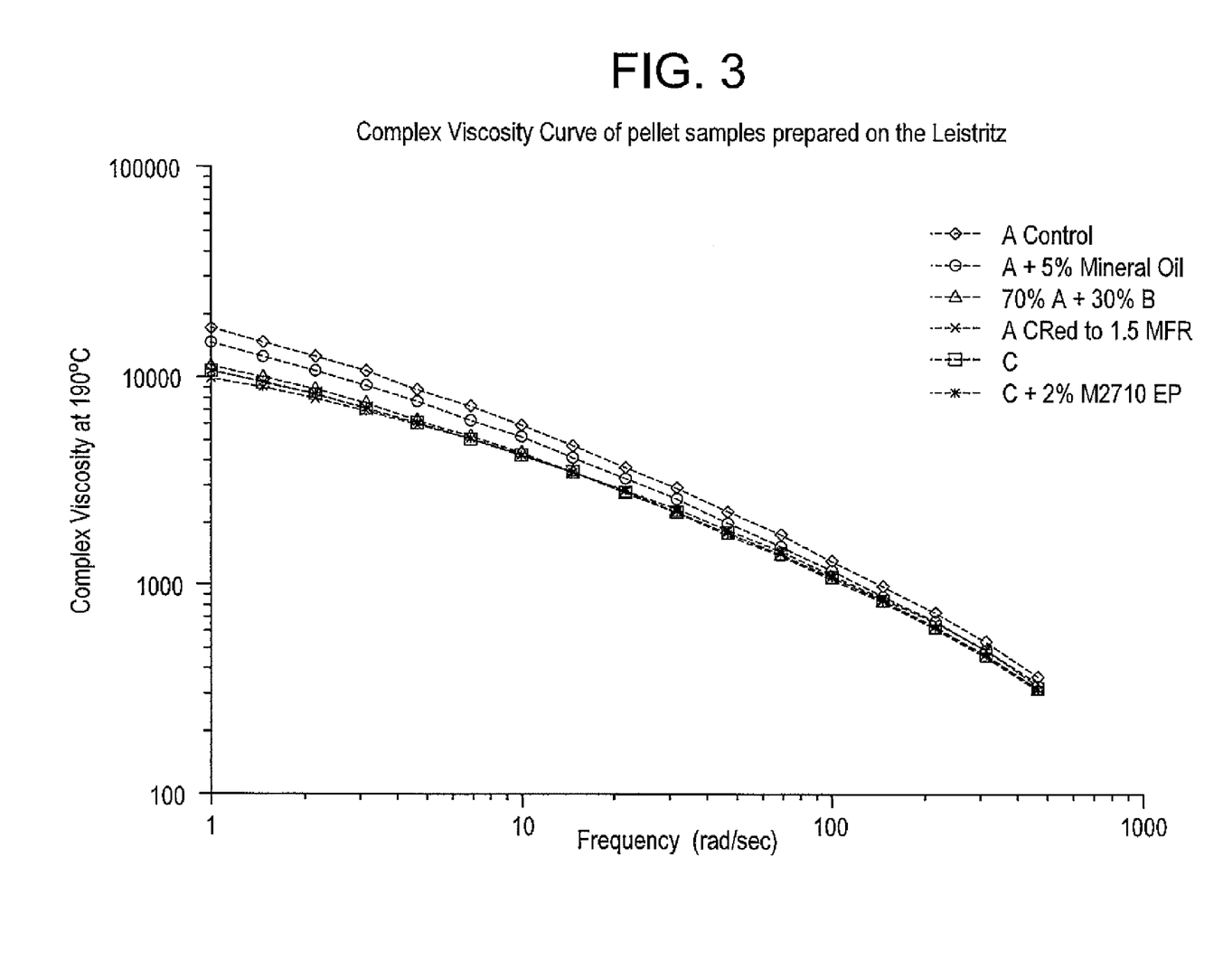
FIG. 3 presents the complex viscosity curve at 190° C. of the polymer samples.

FIG. 3 presents the complex viscosity curve at 190° C. of the pellet samples prepared on the twin extruder.

Table 2 presents the compounding and blown film extrusion data of the samples prepared. The pressure measurements obtained are in agreement with the zero shear viscosity of the pellet samples. Although lower pressures were observed for all the samples as compared to the A control, a slight bubble dancing instability (thus requiring the use of IBS) was observed for the higher modified MFR samples during blown film processing. No bubble dancing was observed for C+2% M2710 EP metallocene medium density and for A+5% Drakeol 35 mineral oil.

TABLE 2

| Sample | Zero Shear Viscosity (Pa·s) | Compounding Extrusion | | | | Blown Film Extrusion | | |
|---|---|---|---|---|---|---|---|---|
| | | Pressure (psig) | Temp. (F.) | Current (amps) | Throughput (lbs/min) | Pressure (psig) | Temperature (F.) | Current (amps) |
| A (control) | 42550 | 2180 | 475 | 37 | 3.4 | 4460 | 456 | 20 |
| A + 5% mineral oil | 34390 | 2194 | 474 | 40 | 3.8 | 4410 | 440 | 18 |
| A + 30% B | 21600 | 1950 | 475 | 37 | 3.5 | 3670 | 437 | 18 |

TABLE 2-continued

| Sample | Zero Shear Viscosity (Pa·s) | Compounding Extrusion | | | | Blown Film Extrusion | | |
|---|---|---|---|---|---|---|---|---|
| | | Pressure (psig) | Temp. (F.) | Current (amps) | Throughput (lbs/min) | Pressure (psig) | Temperature (F.) | Current (amps) |
| A + C to 1.5MFR | 16040 | 1814 | 483 | 40 | 3.7 | 3480 | 439 | 17 |
| C | 18840 | 1890 | 481 | 38 | 3.8 | 3620 | 440 | 18 |
| C + 2% M2710 | 19320 | 1910 | 484 | 38 | 4.1 | 3610 | 438 | 17 |

Figure 4:
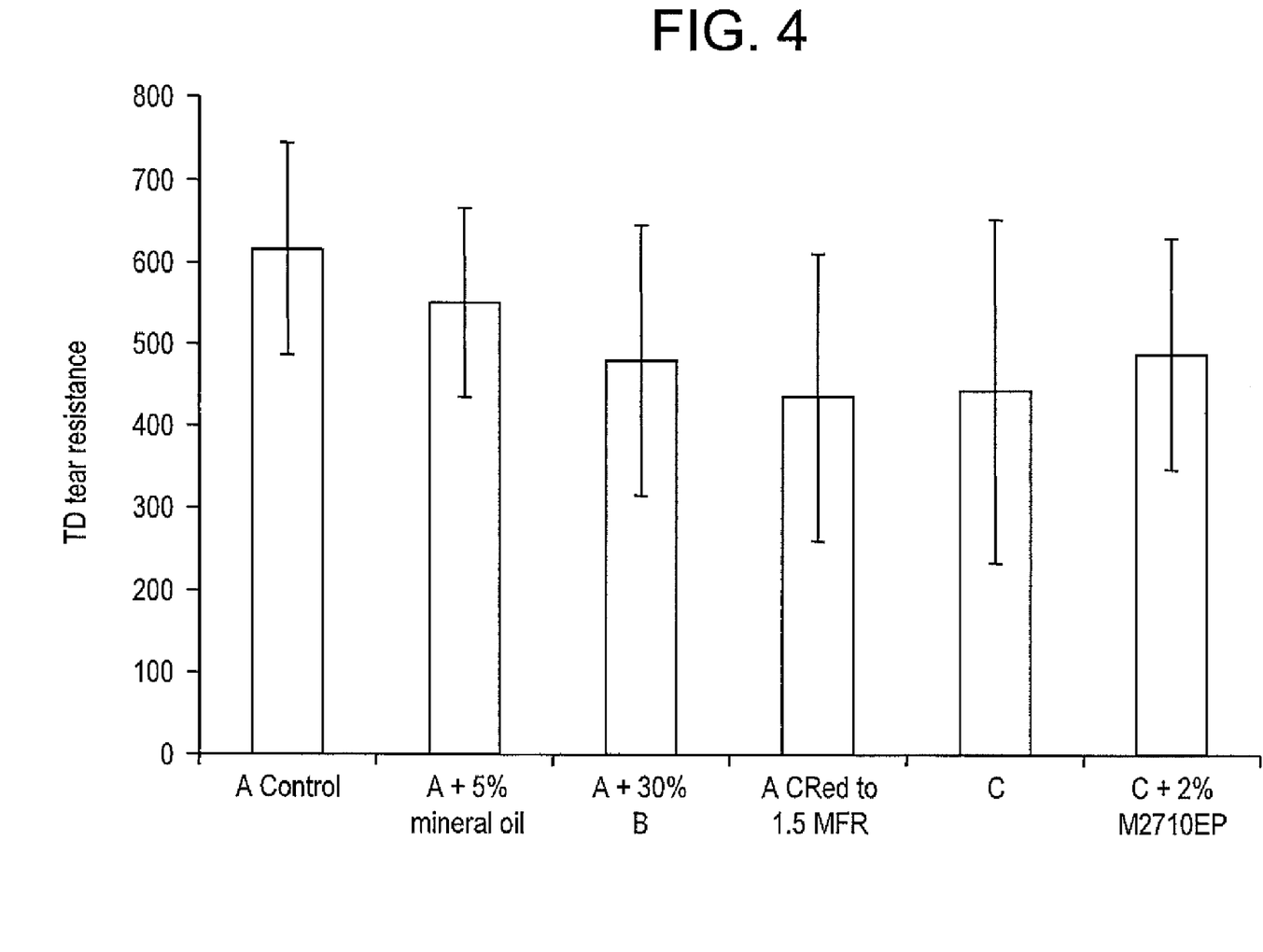
FIG. 4 presents the transverse direction tear resistance of the film samples.

FIG. 4 presents the transverse direction tear resistance of the film samples produced on the Alpine. The TD tear results are within the standard deviation obtained from the tests.

Conclusions: A negligible effect on the viscosity of A was obtained with 1% polyethylene wax, 1% silicone gum, and 10% Samsumg HM200F irradiated homopolymer Increasing the melt flow of A through B had the greatest effect in improving the processing; however, a slight bubble dancing instability was observed during the blown film processing of these higher modified MFR samples. A 10% gain in throughput during compounding, 13% reduction in pressure during extrusion and no bubble dancing during film blowing was observed for C+2 wt. % Total Petrochemicals M2710 EP metallocene medium density polyethylene. A similar gain in throughput but no reduction in extrusion pressure was observed for a blend consisting of A+5% mineral oil Drakeol 35. At the conditions evaluated, the effect of these additives on the blown film properties (tear and puncture) are within the variation of the test results.

Example 2

Samples of blown film were prepared according to the first embodiment. The samples included were prepared according to the procedure of Example 1 and included 70 wt. % A and 30 wt. % B. Sample 1 (control) further included 500 ppm calcium stearate, 800 ppm 1010, 50 ppm 1076 and 800 ppm 168. Sample 2 further included Milliad 3988. Sample 3 further included Milliad 3988 clarifier, 2 wt. % M2710 and 5 wt. % mineral oil.

Figure 5:
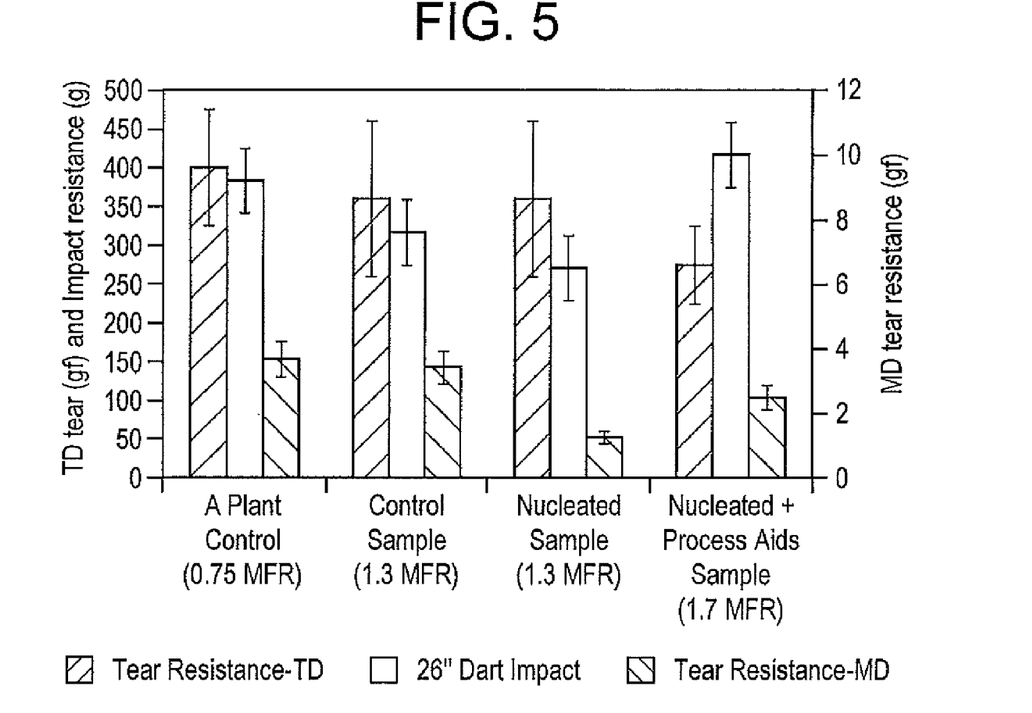
FIG. 5 illustrates the tear and dart impact resistance of the film samples.

Results: During blown film processing, Sample 1 (control) showed significant bubble dancing that required external bubble stabilizer (EBS). The use of Milliad 3988 lowered the frost line height, required less air volume (blower at 30 Hz vs 40 Hz) and eliminated the bubble dancing instability (no EBS was required) of the sample (Sample B). See, FIG. 5, illustrating the tear and dart impact resistance of the blown films. Sample 3 (1.7 MFR) also showed very good bubble stability (requiring no EBS) and extrusion pressures are 25% lower as compared to the 0.75 MFR control sample (Sample 1). The machine direction tear resistance of this sample was improved and the transverse direction tear resistance was negatively affected but the result is within the standard deviation of the measurements. The dart impact resistance was not as greatly affected.

Example 3

Samples of blown film were prepared according to the first embodiment. The samples included were prepared according to the procedure of Example 1 and included 70 wt. % A and 30 wt. % B. Sample 1 (control) further included 500 ppm calcium stearate, 800 ppm 1010, 50 ppm 1076 and 800 ppm 168. Sample 2 included the formulation of Sample 1 in addition to 0.2 wt. % Milliad 3988. Sample 3 included the formulation of Sample 1 in addition to 0.1 wt. % sodium benzoate. Sample 4 included the formulation of Sample 1 in addition to 0.06 wt. % NA-11. Sample 5 included the formulation of Sample 1 in addition to 0.1 wt. % NA-71. Sample 6 included the formulation of Sample 1 in addition to 0.03 wt. % HPN68L.

Results: All of the samples gave very good bubble stability (no bubble dancing and no external bubble stabilizer was required at high speed) while the control sample presented bubble instability. The sample with sodium benzoate narrowed the processing window to achieve bubble stability and air velocity (air ring gap) was found to be an important factor to achieve good bubble stability. Less efficient nucleators required a greater amount of cooling air and narrower air gap. The blown film samples produced were tested and no significant difference in dart impact resistance, machine direction tear, gloss and haze is found among the nucleated samples. The sample produced using 0.06% NA-11 as nucleator produced significantly better transverse direction tear resistance (500 g) among the nucleated samples. Very good transverse tear resistance (400 g) was also obtained with 0.03% HPN68L clarifier.

Example 4

Figure 6:
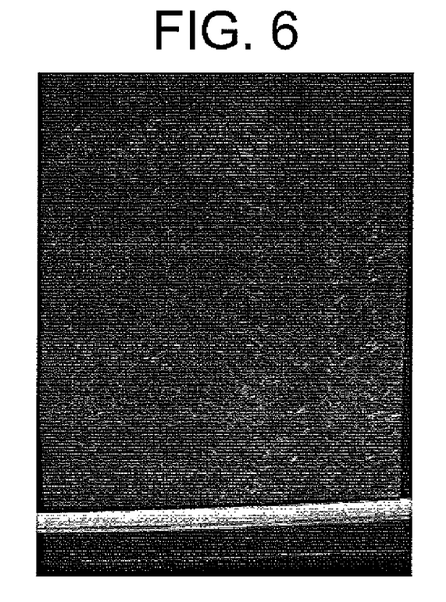
FIG. 6 illustrates gross surface distortions on the film samples.
Figure 7:
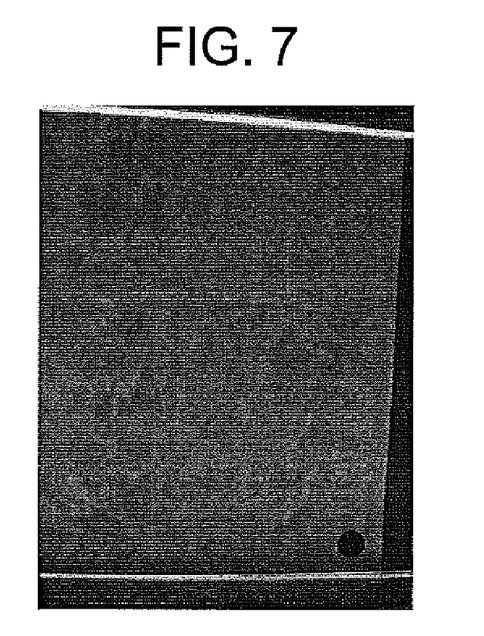
FIG. 7 illustrates interfacial distortions on film samples.
Figure 8:
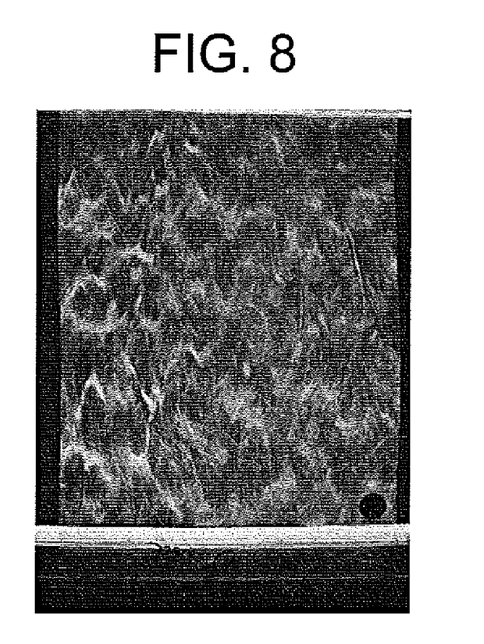
FIG. 8 illustrates interfacial distortions on film samples.

A medium density polyethylene ("A") having a density of 0.938 g/cc was used a the majority phase coextruded with a heterophasic copolymer ("B") having a melt flow rate of 20 after blending of the two components was unsuccessful, e.g., the sample having 30 wt. % high MFR polymer, lacked sufficient melt strength for blowing into film. See, FIG. 6 illustrating gross surface distortions on a sample having 15 wt. % high MFR polymer. The coextruded sample used an A/B/A structure and resulting in stable film formation (no visible interfacial distortions) at loadings of 35/30/35 wt. %. See, FIG. 7. However, increasing the loading to 20/60/20 wt. % resulted in unstable films (chaotically dispersed thick and thin spots). See, FIG. 8. The unstable films still provided sufficient strength.

During these experiments it was observed that increasing the MFR to reduce the melt extrusion pressure negatively affected the bubble instability. The use of a nucleator in the higher MFR polymer facilitated the crystallization such that bubble stability was improved. Table 3 is a qualitative summary of the effects that each modification had in extrusion pressure, throughput, bubble stability, and blown film properties. The purpose of the modifications was to obtain a polymer that can process with significantly reduced extrusion pressures without affecting the bubble stability. The higher MFR and the mineral oil improved the extrusion pressure but negatively affected the bubble stability. To overcome the bubble stability problem without affecting the improvement in extrusion pressure, metallocene polyethylene and a nucleator/clarifier were used in the formulation. The end result of these modifications is a reduction of the extrusion pressure with the same bubble stability and a negligible positive effect on the film properties.

TABLE 3

The effect of the modifications in the processability and film properties

|  | Extrusion Pressure | Extrusion Throughput | Bubble Stability | Dart Impact | Tear Resistance |
|---|---|---|---|---|---|
| Higher 1.3 MFR (5724 fluff) | +++ | + | --- | − | − |
| 2% mPE (M2710 EP) |  | + | +++ | ++ | ++ |
| 2% Mineral Oil (Drakeol 34) | ++ | + | -- | + | + |
| 0.03% Nucleator (HPN68L)* |  |  | ++ | --- | -- |
| 11.5% ethylene (5724 fluff) |  |  |  | +++ | + |
| Proposal vs. 4170 | +++++ | +++ | same | ++ | + |
| Proposal without mPE vs 4170 | +++++ | ++ |  | same | same |

"+" represents an improvement or positive result,
"−" represents a negative effect.
The frequency of the symbol represents the degree of the effect.

While the foregoing is directed to embodiments of the present invention, other and further embodiments of the invention may be devised without departing from the basic scope thereof and the scope thereof is determined by the claims that follow.

What is claimed is:

1. A process for enhancing blown film processability comprising:
    providing a first propylene based heterophasic copolymer comprising a first melt flow rate;
    contacting the first propylene based heterophasic copolymer with a second heterophasic copolymer comprising a second melt flow rate to form a combined heterophasic copolymer, wherein the second melt flow rate is greater than the first melt flow rate;
    modifying the first heterophasic polymer, the second heterophasic copolymer or a combination thereof with a plurality of additives, wherein the plurality of additives comprise a nucleator and mineral oil to form a modified heterophasic copolymer;
    modifying the first heterophasic polymer, the second heterophasic copolymer or a combination thereof with polyethylene, wherein the polyethylene is metallocene-based and wherein the polyethylene is used in concentrations of from about 2 wt. % to about 4 wt. % by weight of the combined heterophasic copolymer; and
    blowing the combined heterophasic copolymer into a film.

2. The process of claim 1, wherein the first propylene based heterophasic copolymer comprises at least about 2 wt. % ethylene.

3. The process of claim 1, wherein the first melt flow rate is less than about 1.0 dg/min.

4. The process of claim 1, wherein the second melt flow rate is greater than about 1.0 dg/min.

5. The process of claim 1 further comprising forming the modified heterophasic copolymer into pellets.

6. The process of claim 5, wherein the pellets are formed at a rate that is at least 10% greater than the same process in the absence of the plurality of additives.

7. A blown film formed from the process of claim 1.

8. A process for enhancing blown film processability comprising:
    providing a first propylene based heterophasic copolymer comprising a first melt flow rate;
    modifying the first propylene based heterophasic copolymer to form a second heterophasic polymer comprising a second melt flow rate, wherein the second melt flow rate is greater than the first melt flow rate, wherein the modifying comprises contacting the first propylene based heterophasic copolymer with a propylene having a third melt flow rate greater than the first melt flow rate in an amount sufficient to form the second melt flow rate;
    contacting the first heterophsic polymer, the second heterophasic copolymer or a combination thereof with a plurality of additives, wherein the plurality of additives comprise a nucleator, polyethylene and mineral oil to form a modified heterophasic copolymer, wherein the modified heterophasic copolymer comprises from 2 wt. % to 4 wt. % polyethylene; and
    blowing the modified heterophasic polymer into a film.

9. The process of claim 8, wherein the first melt flow rate is less than about 1.0 dg/min and the third melt flow rate is greater than about 5 dg/min.

* * * * *